(12) United States Patent
Baligh et al.

(10) Patent No.: US 8,693,442 B2
(45) Date of Patent: Apr. 8, 2014

(54) MULTI-SITE MIMO COOPERATION IN CELLULAR NETWORK

(75) Inventors: Mohammadhadi Baligh, Kanata (CA); Jianglei Ma, Kanata (CA); Hua Xu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 357 days.

(21) Appl. No.: 13/068,837

(22) Filed: Sep. 21, 2009

(65) Prior Publication Data

US 2012/0087335 A1     Apr. 12, 2012

Related U.S. Application Data

(60) Provisional application No. 61/098,978, filed on Sep. 22, 2008.

(51) Int. Cl.
  *H04W 4/00* (2009.01)
  *H04B 7/14* (2006.01)

(52) U.S. Cl.
  USPC .......................................... 370/334; 370/315

(58) Field of Classification Search
  USPC .................. 370/330, 334, 337, 343, 315, 319
  See application file for complete search history.

(56) References Cited

U.S. PATENT DOCUMENTS

| | | | |
|---|---|---|---|
| 7,403,570 B2 | 7/2008 | Ma et al. | |
| 7,724,838 B2 * | 5/2010 | Mantravadi | 375/295 |
| 8,179,775 B2 * | 5/2012 | Chen et al. | 370/203 |
| 8,488,480 B2 * | 7/2013 | Han et al. | 370/252 |
| 2003/0069043 A1 | 4/2003 | Chhaochharia et al. | |
| 2004/0152491 A1 | 8/2004 | Lobinger et al. | |
| 2004/0259565 A1 | 12/2004 | Lucidarme | |
| 2005/0152476 A1 * | 7/2005 | Coersmeier | 375/322 |
| 2007/0099578 A1 | 5/2007 | Adeney et al. | |
| 2008/0318613 A1 | 12/2008 | Balachandran et al. | |
| 2009/0010215 A1 * | 1/2009 | Kim et al. | 370/329 |
| 2009/0017753 A1 * | 1/2009 | Kim et al. | 455/10 |
| 2009/0097468 A1 | 4/2009 | Yi et al. | |
| 2009/0111473 A1 | 4/2009 | Tao et al. | |
| 2009/0147728 A1 * | 6/2009 | Atia et al. | 370/321 |
| 2009/0232113 A1 * | 9/2009 | Tamaki | 370/337 |
| 2009/0262846 A1 * | 10/2009 | Ko et al. | 375/260 |
| 2009/0268657 A1 * | 10/2009 | Alexiou et al. | 370/315 |
| 2009/0285173 A1 * | 11/2009 | Koorapaty et al. | 370/330 |
| 2009/0296626 A1 * | 12/2009 | Hottinen et al. | 370/315 |

(Continued)

OTHER PUBLICATIONS

Ibing, Andreas et al.; "Scaleable Network Multicast for Cooperating Base Stations"; Franuhofer Institute for Telecommunications; Berlin, Germany; Jan. 6, 2008.

(Continued)

*Primary Examiner* — Brian D Nguyen
(74) *Attorney, Agent, or Firm* — Fish & Richardson P.C.

(57) ABSTRACT

In a cellular communications network comprising a plurality of transmitting sites wherein each transmitting site comprises at least one antenna, a method of serving a given data stream to a target mobile terminal, comprising: designating at least two of the plurality of transmitting sites as cooperating sites; assigning tones to each transmitting site from a sub-band associated with the cooperating sites; dividing the data stream into at least two sub-data streams, each of the sub-data streams for transmission over selected tones; and interlacing tones of the cooperating sites in accordance with a selected one of a time switching and a frequency switching transmit diversity technique.

20 Claims, 10 Drawing Sheets

(56) References Cited

U.S. PATENT DOCUMENTS

| | | |
|---|---|---|
| 2009/0299836 A1* | 12/2009 | Sachs et al. .................. 705/14.4 |
| 2010/0027454 A1 | 2/2010 | Hou et al. |
| 2010/0035555 A1* | 2/2010 | Bala et al. .................... 455/63.1 |
| 2010/0069122 A1* | 3/2010 | Ito .............................. 455/562.1 |
| 2010/0150266 A1* | 6/2010 | Mondal et al. ................ 375/296 |
| 2010/0189055 A1* | 7/2010 | Ylitalo .......................... 370/329 |
| 2010/0234053 A1 | 9/2010 | Zangi et al. |
| 2010/0323611 A1* | 12/2010 | Choudhury ...................... 455/7 |
| 2011/0034175 A1* | 2/2011 | Fong et al. .................... 455/450 |
| 2011/0041021 A1* | 2/2011 | Khoshnevis et al. ......... 714/748 |
| 2011/0105170 A1 | 5/2011 | Gan et al. |
| 2011/0194540 A1 | 8/2011 | Baligh et al. |

OTHER PUBLICATIONS

International Search Report and Written Opinion of the International Searching Authority issued in International Application No. PCT/CA2010/001510 on Jun. 9, 2011.

Office Action issued in U.S. Appl. No. 12/887,004 on Mar. 12, 2013; 22 pages.

Office Action issued in U.S. Appl. No. 13/620,503 on Mar. 12, 2013; 22 pages.

Office Action issued in U.S. Appl. No. 12/887,004 on Aug. 14, 2013; 24 pages.

Final Office Action issued in U.S. Appl. No. 13/620,503 on Aug. 14, 2013, 24 pages.

* cited by examiner

MULTI-SITE MIMO COOPERATION IN CELLULAR NETWORK

CROSS-REFERENCE TO RELATED APPLICATIONS

This application claims the benefit of priority from U.S. patent application Ser. No. 61/098,978 filed Sep. 22, 2008.

TECHNICAL FIELD

This application relates to wireless communication techniques in general, and to a techniques of the present disclosure, in particular.

SUMMARY

Aspects and features of the present application will become apparent to those ordinarily skilled in the art upon review of the following description of specific embodiments of the disclosure in conjunction with the accompanying drawing figures and appendices.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Wireless System Overview

Figure 1:
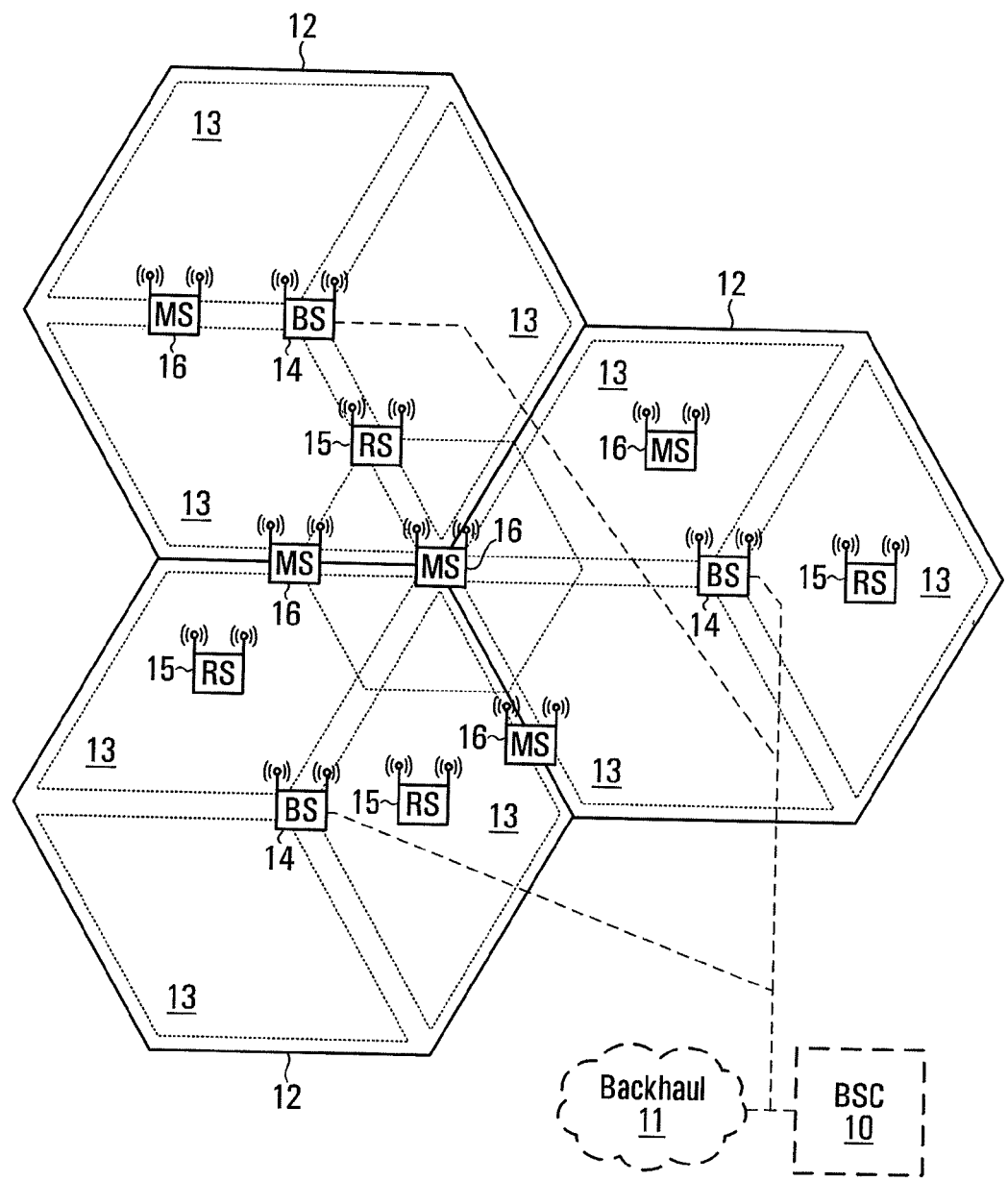
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
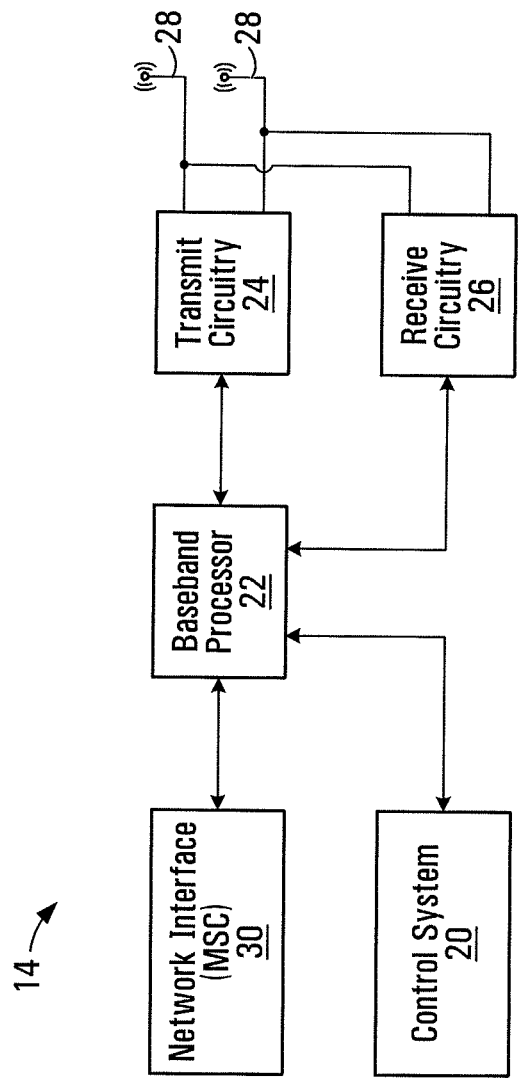
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
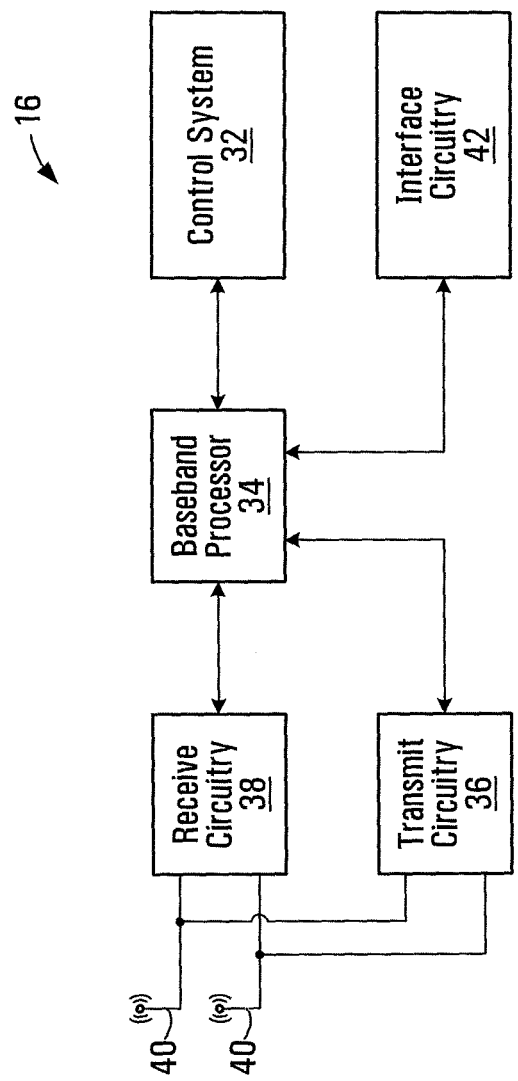
FIG. 3 is a block diagram of an example wireless terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
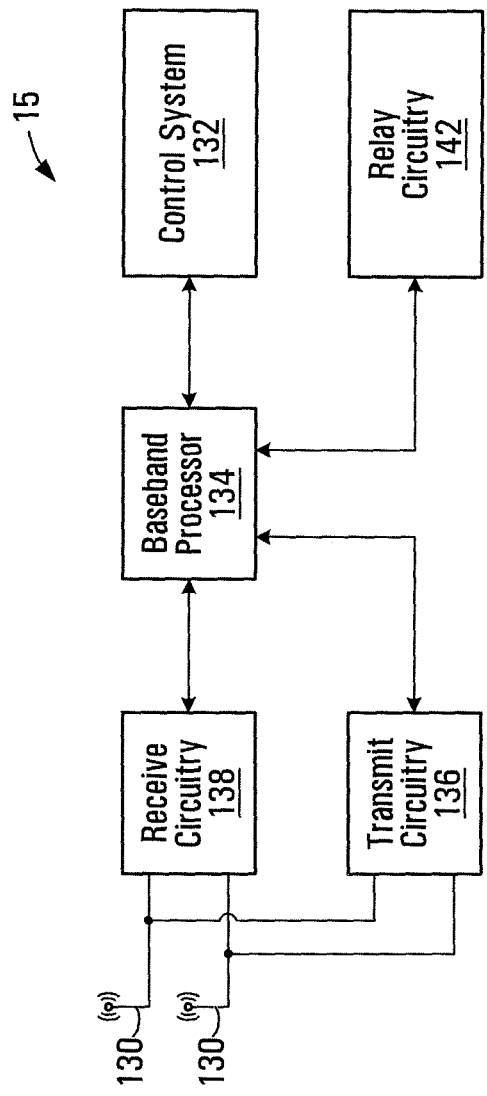
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
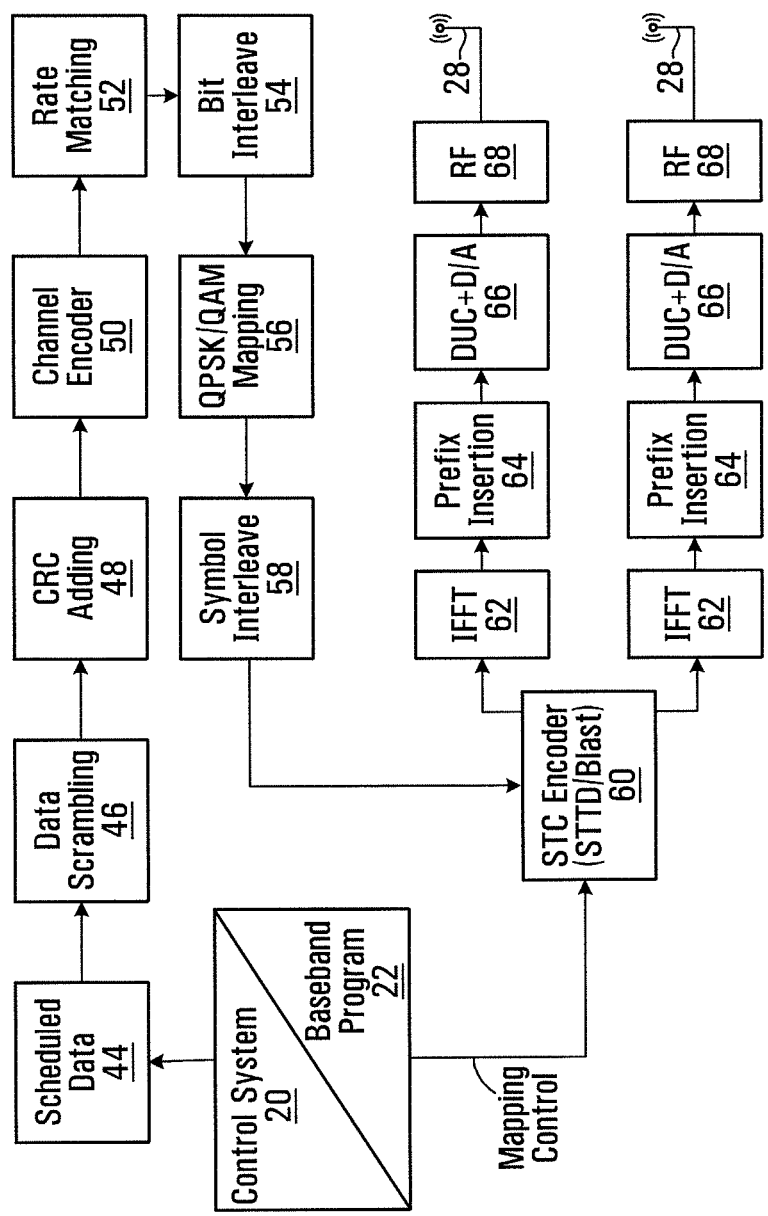
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
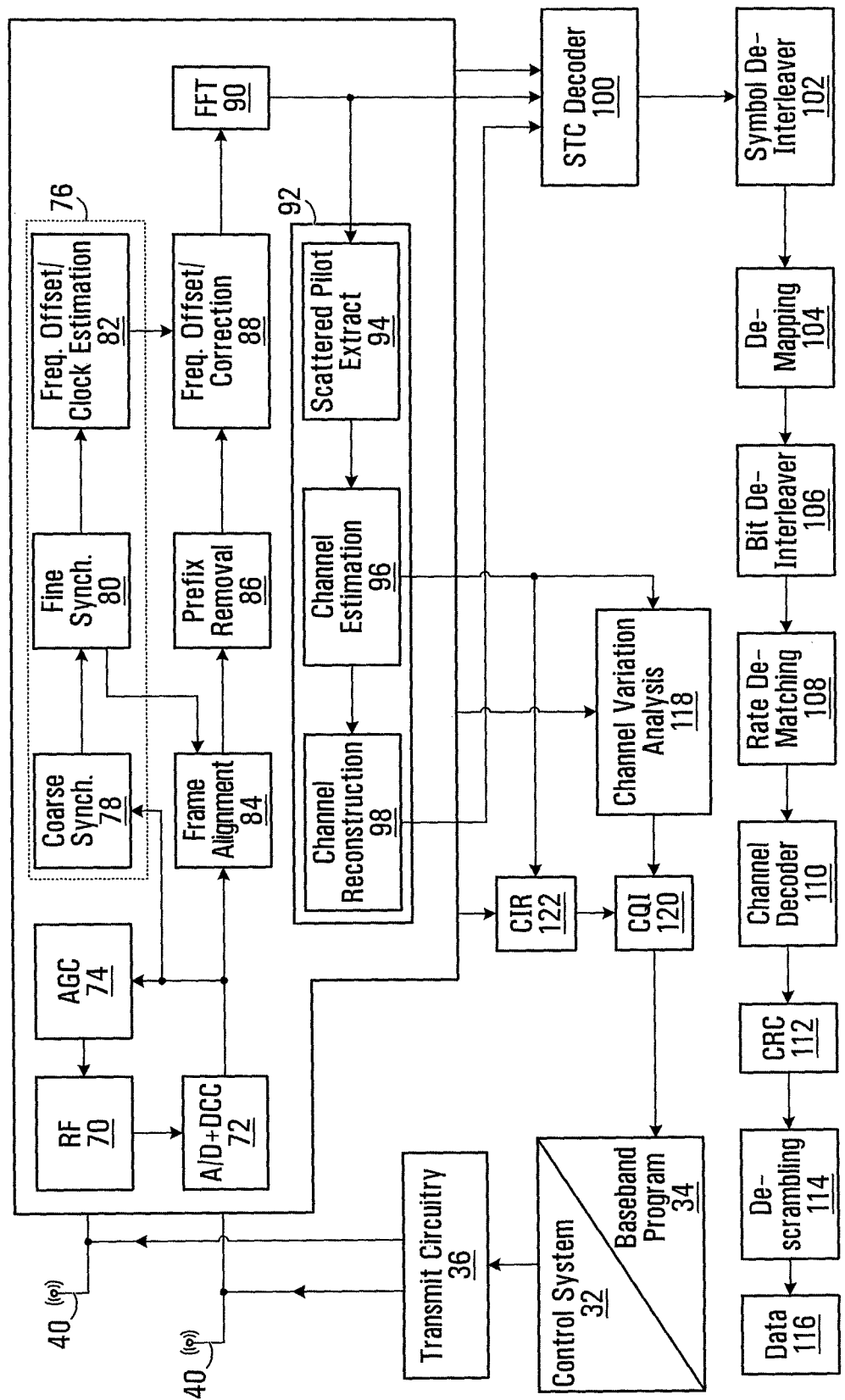
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OHM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
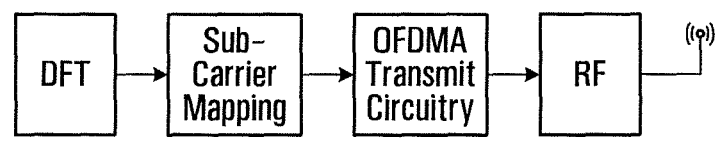
FIGS. 7A and 7B are examples SC-FDMA transmitter and receiver for single-in single-out (SISO) configuration provided in accordance with one embodiment of the present application.
Figure 7B:
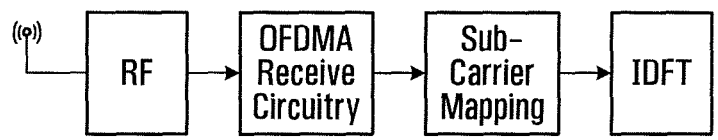

Referring to FIG. 7, an example SC-FDMA transmitter 7(a) and receiver 7(b) for single-in single-out (SISO) configuration is illustrated provided in accordance with one embodiment of the present application. In SISO, mobile stations transmit on one antenna and base stations and/or relay stations receive on one antenna. FIG. 7 illustrates the basic signal processing steps needed at the transmitter and receiver for the LTE SC-FDMA uplink. In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme. There are several similarities in the overall transceiver processing of SC-FDMA and OFDMA. Those common aspects between OFDMA and SC-FDMA are illustrated in the OFDMA TRANSMIT CIRCUITRY and OFDMA RECEIVE CIRCUITRY, as they would be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, PAPR of SC-FDMA signal is lower than the PAPR of OFDMA signal. Lower PAPR greatly benefits the mobile terminal in terms of transmit power efficiency.

FIGS. 1 to 7 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Technical Information
Brief Description of the Application:

The application involves the closed loop cooperation schemes between two or more sites. These sites can be base stations, relays, access points or distributed antennas.

We categorize such schemes into closed loop and semi closed loop schemes. In fully closed loop schemes, the signal from different sites constructively add at the receiver. We discuss BF cooperation, precoding cooperation and cooperation between the BF and precoding sites.

We introduce codebook based phase correction to ensure constructive superposition. We also introduce virtual antenna cooperation to minimize feedback overhead by reducing the number of total antenna ports.

In the semi closed loop schemes, the cooperating sites each have internal closed loop transmission to the user while the cooperation between different sites is open loop with now channel state information exchange between the sites.

Problem Solved by the Application:

In this application, we study some solutions for closed loop cooperation between different sites.

We also study the problem of phase mismatch between the beams arriving from different sites.

We also study open loop cooperation between closed loop sites

Solutions that have been Tried and why they Didn't Work:

Previously, open loop cooperation schemes have been proposed. Such schemes are more useful for medium and high speed users and do not exploit the channel state information feedback to the cooperating sites.

While closed loop cooperation introduced before, it usually requires extra provisions in the standard and involves iger feedback overhead. Also, the problem of constructive superposition between different site exists. We provide methods to reuse the existing single-site closed loop features and solve the phase mismatch between the sites. We also provide a solution to reduce the feedback overhead.

X-MIMO (interference alignment) is also proposed for such cooperation which is applicable only to high-geometry low-speed users and requires multi-site multi-user cooperation.

Specific Elements or Steps that Solved the Problem and how they do it:

With closed loop cooperation, all sites send signal (using a CL scheme or beam forming) to the user. This can be done using multi-site precoding or multiple single-site beam formings or precodings. While single-site CL schemes guarantee constructive superposition for the signal from each site, phase correction between different sites is required for constructive addition between different sites. For this purpose, beams from different sites are assumed as different antenna ports and using a constant amplitude codebook, phases between the sites are aligned. We also propose virtual antenna cooperation to reduce the feedback overhead for multi-site precoding technique. With this technique, the number of ports for each sites is reduced using virtual antenna concept allowing for reduced feedback overhead.

We also propose semi closed loop cooperation where all/some cooperating sites perform closed loop transmission to the user while the cooperation between the sites is open loop. These techniques include transmit diversity and spatial multiplexing.

Figure 8A:
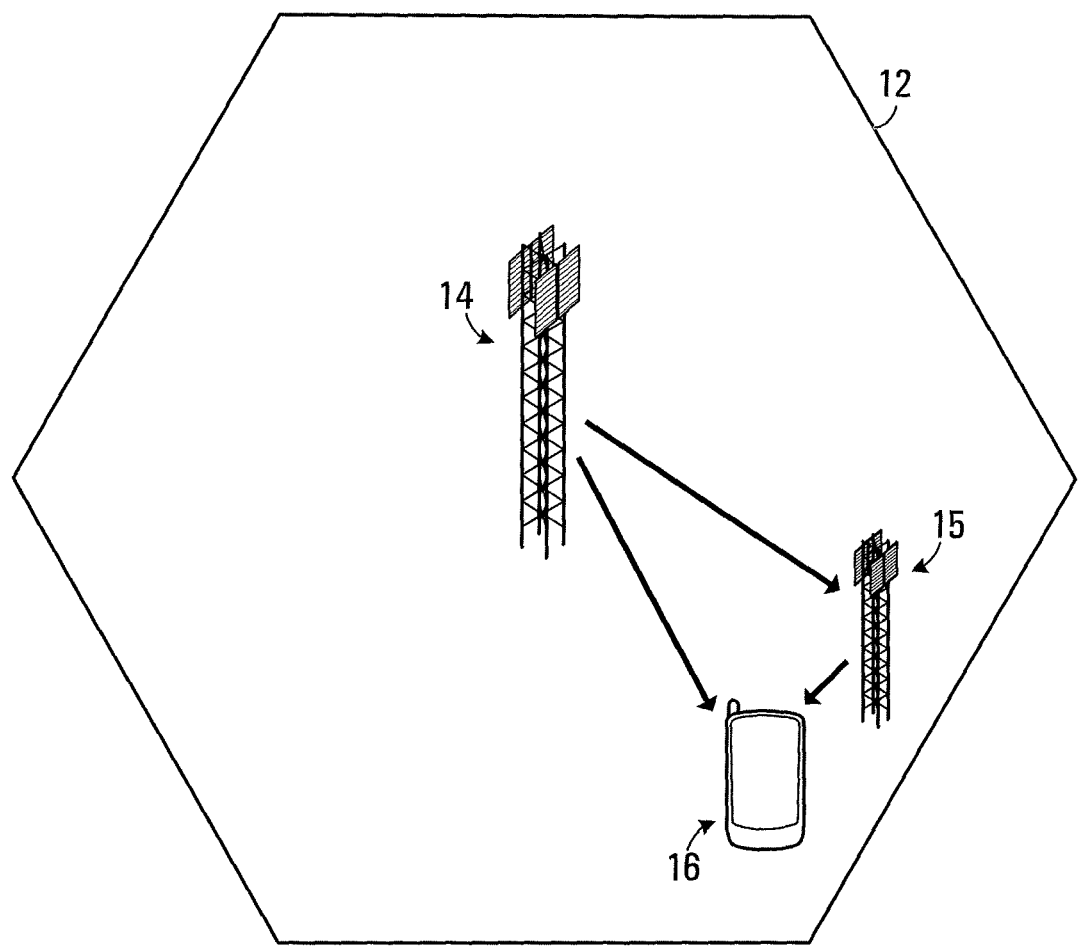
FIGS. 8A, 8B and 8C are block diagrams of an exemplary cellular communications system including cooperating transmitting sites in which the disclosed embodiments of the present application may be applied.
Figure 8B:
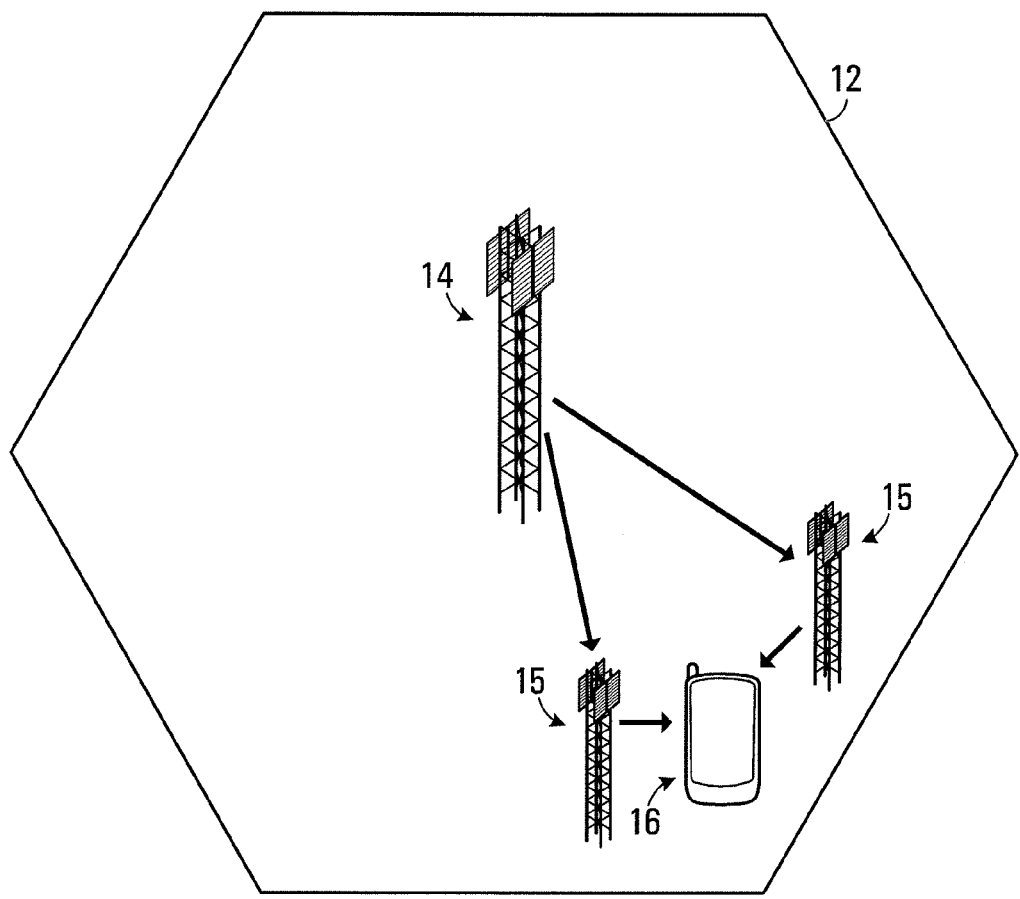
Figure 8C:
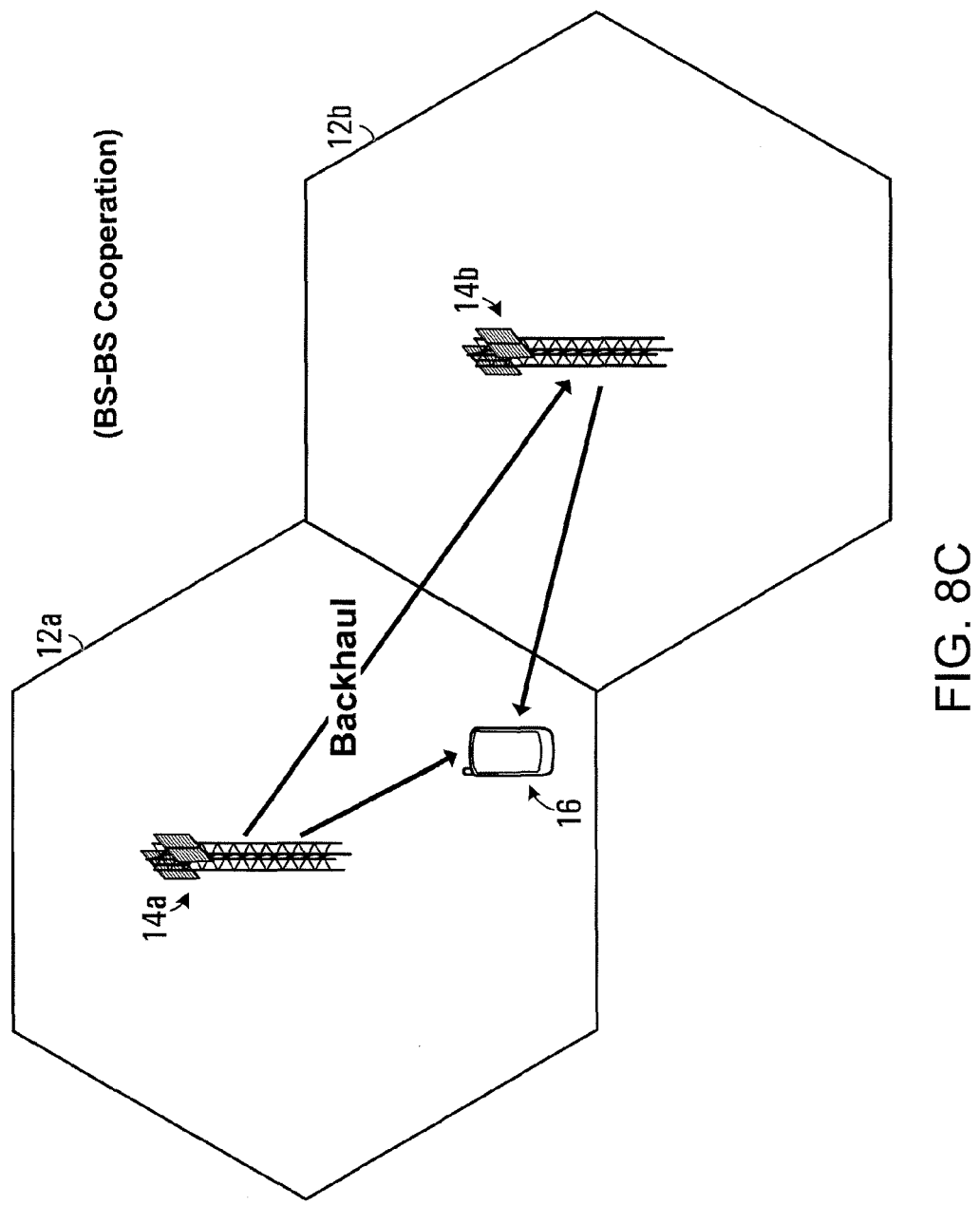

Outline:
  Introduction
  Prior Art
    Open Loop Cooperation Solutions
    Interference Alignment
  Cooperation Solutions
    Closed Loop Cooperation, Constructive Addition Techniques
    Semi CL schemes
    Heterogeneous Sites
Introduction
  In a cellular system, some users receive relatively strong signal from more than one site.
    Access point (AP) or base station (BS) or relay
  Without cooperation, the signal from sites other than the serving one limits the SINR.
  Cooperation between different sites turns interference to useful signal.
  In this DoI, we propose the following cooperation modes.
    Closed loop cooperation
      Partial or full CSI knowledge at transmitter
      Relies on constructive addition at the receiver, spatial multiplexing or interference alignment
    Semi CL cooperation
      All/some cooperating sites perform CL within each site, but the cooperation among sites is OL
  Cooperation Scenarios
  FIGS. 8A, 8B and 8C are block diagrams of an exemplary cellular communications system including cooperating transmitting sites in which the disclosed embodiments of the present application may be applied.
- Location of cooperating sites
  - Within the same cell
    - BS-relay-FIG. 8A.
    - Relay-relay-FIG. 8B.
  - BS with distributed antenna
  - Two or more different cells
    - BS-BS-FIG. 8C.
- Cooperation Scenarios (Cont)
  - Data exchange: None, partial or full
  - Channel state information at transmitter: none, partial or full
  - Demodulation pilot
    - Overlapping dedicated pilots: uses channel superposition for decoding
    - Orthogonal pilots: channel coefficients from all cooperating sites are estimated
  - Transmit antenna deployment:
    - Array antennas: Closed spaced parallel antennas
    - MIMO antennas: Low-correlated antennas
- Prior Art-1: Open Loop Cooperation Solutions
  - No need for channel state information at transmitter
    - Transmit Diversity Schemes
      - Band switching transmit diversity: Different subbands are allocated to the user in the cooperating sites
      - PDD/Short CDD: Apply phase delay or cyclic delay to generate spatial diversity through FEC.
      - Space-time-frequency transmit diversity: Different sites use the same resource using space-tone codes.
    - Spatial Multiplexing Schemes:
      - Different sites transmit independent data streams to the receiver.
- Prior Art-2: Interference Alignment
  - X-MIMO (Multi-site MU-MIMO): Different (MIMO) sites transmit sets of independent data to different users on the same resource.
    - Applicable to high geometry users.
    - Cooperating sites align their interferences at all nodes.
    - Maximizes multiplexing gain.
    - Two or more sites serve two or more users on the same resource.
    - Improves throughput for high geometry users.
    - Each site sends data to more than one user. All sites try to align their induced interference to other users.
- Issues
  - OL cooperation
    - Does not utilize the channel knowledge at the transmitter.
  - X-MIMO
    - Only applies to high geometry users.
    - Requires pairing up two or more users served by the same set of BS.
    - Channel knowledge overhead is very high and hence, is limited to fixed or low speed users.

Embodiment-1

Open Loop Cooperation, Tone Switching Transmit Diversity

Time/frequency (tone) switching transmit diversity: Different adjacent tones are used by different sites.
- All sites transmit on the same subband(s).
- Each cooperating site transmits only in a portion of tones in the assigned subband(s).
- The tones assigned to different sites are interlaced in the time and/or frequency direction.
- This technique can be combined with other transmit diversity cooperating schemes such as space-time-frequency transmit diversity (example: combine with alamouti code).
- Antennas within each site are using an open loop scheme (such as transmit diversity or spatial multiplexing).

Embodiment-2

Closed Loop Cooperation, Constructive Addition Techniques

In all cooperation modes, one site is called serving which the user belong to its coverage area.
- Timing/distance adjustment is required between the sites.
- Multi-site BF: Different (array) sites form their individual beams to the same user.
  - Phase correction between these beams to ensure constructive addition.
    - Codebook phase correction
    - Report phase difference
    - Opportunistic phase correction
- Multi-site closed loop pre coding: Different (MIMO) sites use precoders to form beams to the user. Requires precoder report in FDD
  - Independent precoder report
    - Find one precoder per site
    - Reuse single-site precoder set
    - Needs Phase correction
  - Aggregate precoder report
    - Find only one precoder for all transmit antennas at all sites (putting all transmit antennas together)
- Heterogeneous closed loop
  - Closed loop cooperation between array and MIMO sites.
- Multi-Site BF
  - Two or more array sites form beams to a user. All beams contain the same content.
  - In FDD, the beam is formed using a user's uplink AoA.
  - Superposition dedicated pilot for channel estimation.
  - Constructive superposition requires timing/distance adjustment between the sites.
  - Even with perfect timing adjustment, the signal from different sites arrive at the UE at different times due to different distance to the user, resulting in a linear phase change over frequency.
  - The user can take one site as the reference and report the timing difference to the other sites.
- Multi-Site BF (Cont)
  - Constructive superposition requires phase adjustment between the sites.
  - Phase difference can be frequency selective.
  - For phase difference detection, orthogonal set of pilots might be needed.
  - Phase adjustment methods
    - Report phase difference implicitly
    - Codebook phase correction
    - Opportunistic phase correction (for nomadic users)
      - Different sites apply random phase sequences.
      - Based on CQI report, the best phase combination is evaluated.
- Multi-Site Closed Loop Precoding
  - Different (MIMO) sites use precoders to form the same beams to the user.

In FDD, user reports the precoders.
Independent precoder report
  Precoders for different sites are reported independently.
    Reuse single-site precoder set.
    Performance improves by phase correction (similar to Multi-site BF)
  Aggregate precoder report
    The precoder is selected considering all transmit antennas.
    Precoder set may be too big.
    No phase correction needed.
    Timing/distance adjustment needed.
      Less susceptible to timing difference than multi-site BF.
  Orthogonal common pilots are needed for precoder selection.
  Orthogonal common pilots or superposition dedicated pilots are needed for demodulation.
Heterogeneous Multi-Site CL/BF
  Array and MIMO sites send the same data stream to the user.
  Precoder selection for the MIMO site
  Timing/distance adjustment between the sites.
  Phase correction between the sites (similar to multi-site BF).
  MIMO site can carry extra data streams to improve throughput.
  Common pilot for FDD precoder selection.
  Superposition dedicated pilot for demodulation.

Embodiment 3

Timing/Distance Adjustment

A timing/distance difference results in linear phase in the frequency domain.
The UE can measure the timing mismatch using arrival time estimation or channel estimation.
To correct the timing mismatch, one site is taken as reference and the timing difference is reported to other sites.
Each site corrects its timing difference by applying a linear phase correction in the frequency domain.
  Linear phase is applied only to tones assigned to the target UE.
  Timing adjustment in the time domain results in timing mismatch to other UEs and is avoided.

Embodiment 4

Codebook-Based Phase Correction

Cooperation between two sites
  Using a 2-Tx constant amplitude codebook.
    Take the non-serving BS site as the phase reference and pre-assign a fixed precoder to that.
    Report a precoder to the serving BS for phase correction.
    Only report phase correction feedback to the serving BS.
Cooperation between M>2 sites
  Using a 2-Tx constant amplitude codebook.
    Take the non-serving BS site as the phase reference and pre-assign a fixed precoder to that.
    Report M−1 precoders to the serving BS and all other non-serving for phase correction.
  Use a M-Tx constant amplitude codebook.
    Take the non-serving BS site as the phase reference and pre-assign a fixed precoder to that.
    Report one precoder to the serving BS and all other non-serving for phase correction.

Example on Codebook-Based Phase Correction

Simple 2-Tx LTE codebook for 2-site cooperation.
  Precoder set is $\{[1,1]^T, [1,j]^T, [1,-1]^T, [1,j]^T\}$.
    It provides phase correction step of 90°.
  Assign serving base station to port 2 and the helping station as port 1.
  Find the best precoder that aligns the phases of the two sites (maximizes the received power)
  Report the precoder to the serving station.
    No need to report to the helping station (the first entry in all codewords are the same)
  The two sites each might have array or MIMO antennas.
  The cooperation performance improves with a bigger codebook.

Example on Codebook-Based Phase Correction (Cont)

Cooperation between two sites to send one-layer data X.

$$Y = [H_1 P_1 \quad H_2 P_2] P_{pc} X + n = H_{eq} P_{pc} X + n$$

$$P_1 = \arg\max_{P \in Q_M} \|H_1 P\|$$

$$P_2 = \arg\max_{P \in Q_M} \|H_2 P\|$$

$$P_{pc} = \arg\max_{P \in Q_2} \|H_{eq} P\|$$

$H_1$ and $H_2$ are the channel matrices from the cooperating sites (the serving site is #2) and n is noise.
$Q_M$ is the set of possible precoders for each site (M is the number of transmit antennas).
  Similar approach for BF case.
$P_1$ and $P_2$ are the corresponding precoders.
$P_{pc}$ is the phase correction precoder from the set of 2-tx precoders Example on Codebook-Based Phase Correction (Cont)

Joint selection of $P_1$, $P_2$ and $P_{pc}$ may improve the performance of closed-loop system.
  Higher codebook search complexity.
For multi-layer scenarios, one phase correction precoder per layer is reported.

Embodiment-5

Cooperation with Lower Feedback Overhead Using Virtual Antenna Precoding

In some scenarios, to limit the feedback overhead and the precoder set size, some virtual antenna precoders can be applied.
  Example: Cooperation between two sites each with 4 antennas to transmit 1 stream.
    Solution 1 (Individual PMI report): PMI1 to site 1 and PMI 2 (both from 4-Tx codebook) to site 2+phase correction.

Solution 2 (Aggregate PMI report): Report one PMI to both sites from 8-Tx codebook. Site 1 uses the upper half of the precoder and site 2 uses the lower half.

Solution 3 (Aggregate PMI report+virtual antenna): Using virtual antenna, each site is equivalent of 2-Tx, then one PMI to both antenna.

The virtual antenna precoder can be derived using AoA.

Solution 2 has the highest gain while solution 3 has lower overhead.

Solution 2 needs a bigger codebook.

Solution 1 needs three PMI feedback.

Embodiment-4

Semi CL Schemes

Multi-site CL Transmit Diversity: Different (MIMO) sites transmit the same closed loop stream(s) to the user using a transmit diversity scheme (like Alamouti).

Multi-site BF Transmit Diversity: Different (Array) sites transmit the same BF stream(s) to the user using a transmit diversity scheme (like Alamouti).

Multi-site closed-loop SM: Different (MIMO) sites transmit independent closed loop streams to the user.

Precoder selection can minimize inter-layer interference.

Reuse the same precoder set.

Multi-site BF SM: Different (array) sites transmit independent beams to the user.

Multi-Site CL Transmit Diversity

Different MIMO sites each send a closed loop stream to the user. Different sites form a transmit diversity scheme between them.

Orthogonal common pilots for precoder selection.

Orthogonal common pilots or orthogonal dedicated pilots for demodulation.

The transmit diversity scheme may include band switching, tone switching and space-tone coding.

Example: cooperation between two 4-tx FDD sites.
User reports two independent precoders to the sites.
The two sites send two streams of Alamouti (SFBC or STBC) to the user.

The same approach is valid for transmit diversity schemes of rate more than one.

Multi-Site BF Transmit Diversity

Different array sites, each send a beam to the user. Different beams form a transmit diversity scheme between them.

Orthogonal dedicated pilots for demodulation.

The transmit diversity scheme may include band switching, tone switching and space-tone coding.

Multi-Site Closed-Loop/BF SM

Multi-site closed-loop SM

Different MIMO sites transmit independent closed loop streams to the user.

Different precoders are selected for different sites.

Reuse the single-site precoder codebook.

Precoder selection to minimize inter-layer interference.

Increases spectral efficiency for high geometry users.

Orthogonal common pilots for FDD precoder selection.

Orthogonal common pilots or orthogonal dedicated pilots for demodulation.

Multi-site BF SM

Different array sites transmit independent beams to the user.

Similar to multi-site BF, AoA may be used for beamforming.

Orthogonal dedicated pilots for demodulation.

Heterogeneous Multi-Site SM/Transmit Diversity

Heterogeneous multi-site SM: Array and MIMO sites transmit independent data streams to the user.

Precoder selection can minimize the interlayer interference between the two sites.

Common pilot for FDD precoder selection.

Orthogonal pilots between the sites for demodulation.

Heterogeneous multi-site transmit diversity: Array and MIMO sites transmit data streams of a transmit diversity scheme to the user.

Common pilot for FDD precoder selection.

Orthogonal pilots between the sites for demodulation.

Semi CL Schemes Vs CL Schemes

Benefits of Semi CL

Easy implementation

Reuse single site feedback signalling and closed loop techniques.

No need for fine timing adjustment

No need for beam phase correction

Facilitate cooperation between MIMO and array sites (heterogeneous cooperation)

More robust against channel aging

Channel coefficients from the same site age in the same way especially at LoS conditions and/or array sites.

More robust against carrier frequency synchronization errors

Benefits of CL

Better performance by exchanging CSI between sites

Key Features-1

Tone switching transmit diversity: open loop cooperation with tones from different sites interlaced.

CL Multi-site cooperation: CL cooperation between two or more sites to send data to a user or users.

Constructive superposition between the signals transmitted by different sites.

CL operation can be based on MIMO channel coefficients, MIMO precoders or beam-forming.

Timing/distance adjustment: To correct the linear phase over frequency due to timing mismatch.

Apply a linear phase in the frequency domain to cancel the effect of timing mismatch.

Codebook phase correction: Using precoding to adjust phase for constructive phase correction.

Using 2-Tx codebook for cooperation between two sites.

Using 2-Tx or M-Tx codebooks for cooperation between M sites.

Key Features-2

Virtual antenna CL precoding: To limit feedback overhead for aggregate precoding matrix report.

Reduce the number of antenna port using the virtual antenna concept at each site.

Semi CL cooperation: OL cooperation between two or more CL sites.

Semi CL transmit diversity: OL cooperation to send the same data from different sites using a transmit diversity scheme (like frequency-switching or Alamouti).

Semi CL spatial multiplexing: OL cooperation to send different data streams from different sites.

CL operation within each site can be based on MIMO channel coefficients, MIMO precoders or beamforming Facilitates cooperation between heterogeneous sites.

The above-described and appended embodiments of the present application are intended to be examples only. Those of skill in the art may effect alterations, modifications and variations to the particular embodiments without departing from the scope of the application.

The invention claimed is:

1. A method of transmitting a data stream to a mobile terminal in a communications network including a plurality of transmitting sites, comprising:
designating at least two of the plurality of transmitting sites as cooperating sites, each cooperating site comprising at least two antennas;
receiving a precoder report from the mobile terminal for each cooperating site; and
at each cooperating site, transmitting the data stream to the mobile terminal using a beam formed by the cooperating site's antennas.

2. The method of claim 1, wherein the precoder report for each cooperating site is independent of the precoder report for the other cooperating sites.

3. The method of claim 1, further comprising at one or more of the cooperating sites, applying a phase adjustment to the transmission.

4. The method of claim 3, wherein the phase adjustment is a frequency selective phase adjustment.

5. The method of claim 1, wherein the precoder report is selected from a precoder set, wherein the precoder set for each cooperating site is the same as the precoder set for single site transmission.

6. The method of claim 1, further comprising at each cooperating site, transmitting a common pilot signal, wherein the common pilot signal at each cooperating site is orthogonal to the common pilot signal of the other cooperating sites.

7. The method of claim 6, wherein the common pilot signal is used by the mobile terminal for selecting a pre-coder for each cooperating site.

8. The method of claim 1, further comprising at each cooperating site, transmitting a superposition dedicated pilot.

9. The method of 8, wherein the superposition dedicated pilot is used by the mobile terminal for demodulation of the transmitted data stream.

10. The method of claim 1, wherein the communications network is a long term evolution network.

11. A communications system comprising:
a plurality of transmitting sites, at least two of the plurality of the transmitting sites designated as cooperating sites and configured to transmit a data stream to a mobile terminal, each cooperating site comprising at least two antennas and further configured to:
receive a precoder report from the mobile terminal for each cooperating site; and
transmit the data stream to the mobile terminal using a beam formed by the cooperating site's antennas.

12. The communications system of claim 11, wherein the precoder report for each cooperating site is independent of the precoder report for the other cooperating sites.

13. The communications system of claim 11, wherein the precoder report is selected from a precoder set, wherein the precoder set for each cooperating site is the same as the precoder set for single site transmission.

14. The communications system of claim 11, wherein one or more of the cooperating sites is further configured to apply a phase adjustment to the transmission.

15. The communications system of claim 14, wherein the phase adjustment is a frequency selective phase adjustment.

16. The communications system of claim 11, wherein each cooperating site is further configured to transmit a common pilot signal, wherein the common pilot signal at each cooperating site is orthogonal to the common pilot signal of the other cooperating sites.

17. The communications system of claim 16, wherein the common pilot signal is used by the mobile terminal for selecting a pre-coder for each cooperating site.

18. The communications system of claim 11, wherein each cooperating site is further configured to transmit a superposition dedicated pilot.

19. The communications system of claim 18, wherein the superposition dedicated pilot is used by the mobile terminal for demodulation of the transmitted data stream.

20. The communications system of claim 11, wherein the communications network is a long term evolution network.

* * * * *

UNITED STATES PATENT AND TRADEMARK OFFICE
CERTIFICATE OF CORRECTION

PATENT NO. : 8,693,442 B2  
APPLICATION NO. : 13/068837  
DATED : April 8, 2014  
INVENTOR(S) : Mohammadhadi Baligh et al.

Page 1 of 1

It is certified that error appears in the above-identified patent and that said Letters Patent is hereby corrected as shown below:

On the Title Page, In Column 2 (Other Publications), In Line 2, Delete "Franuhofer" and insert -- Fraunhofer --, therefor.

In the Specification

In Column 1, In Line 9, Delete "2008" and insert -- 2008, the contents of which are hereby incorporated by referenced. --, therefor.

In the Claims

In Column 16, In Line 1, In Claim 9, delete "of 8," and insert -- of claim 8, --, therefor.

Signed and Sealed this  
First Day of July, 2014

Michelle K. Lee  
*Deputy Director of the United States Patent and Trademark Office*